United States Patent
Urabe

(10) Patent No.: US 7,460,382 B1
(45) Date of Patent: *Dec. 2, 2008

(54) FLASH MEMORY MODULE

(75) Inventor: Masayuki Urabe, Isehara (JP)

(73) Assignee: Marvell International Ltd., Hamilton (BM)

( * ) Notice: Subject to any disclaimer, the term of this patent is extended or adjusted under 35 U.S.C. 154(b) by 82 days.

This patent is subject to a terminal disclaimer.

(21) Appl. No.: 11/070,623

(22) Filed: Mar. 2, 2005

Related U.S. Application Data

(63) Continuation of application No. 10/348,091, filed on Jan. 21, 2003, now Pat. No. 6,972,977.

(51) Int. Cl.
*G11C 15/00* (2006.01)
(52) U.S. Cl. .................. 365/49; 365/50; 365/185.33
(58) Field of Classification Search ............ 365/49, 365/189.06, 189.07, 230.06, 50, 185.33; 711/154, 143, 160
See application file for complete search history.

(56) References Cited

U.S. PATENT DOCUMENTS

| | | | |
|---|---|---|---|
| 5,150,472 A | 9/1992 | Blank et al. ............ 711/137 |
| 5,325,504 A | 6/1994 | Tipley et al. | |
| 5,367,653 A | 11/1994 | Coyle et al. ............ 711/128 |
| 5,434,993 A | 7/1995 | Liencres et al. .......... 711/133 |
| 5,799,203 A * | 8/1998 | Lee et al. ............... 710/8 |
| 5,802,559 A | 9/1998 | Bailey ................. 711/118 |
| 5,860,083 A * | 1/1999 | Sukegawa ............. 711/103 |
| 6,717,583 B2 | 4/2004 | Shimomura et al. ...... 345/542 |
| 6,785,767 B2 * | 8/2004 | Coulson ............... 711/112 |
| 6,859,399 B1 | 2/2005 | Azimi | |
| 6,871,264 B2 | 3/2005 | Soltis, Jr. ............. 711/122 |
| 6,941,423 B2 * | 9/2005 | Coulson ............... 711/141 |
| 6,972,977 B1 * | 12/2005 | Urabe ................. 365/49 |
| 7,103,724 B2 * | 9/2006 | Royer et al. ........... 711/137 |
| 7,117,328 B2 * | 10/2006 | Shibuya et al. ......... 711/162 |
| 7,275,135 B2 * | 9/2007 | Coulson ............... 711/143 |
| 2002/0144057 A1 | 10/2002 | Kendall | |
| 2002/0144059 A1 | 10/2002 | Kendall | |
| 2003/0126365 A1 | 7/2003 | Jamil et al. | |

FOREIGN PATENT DOCUMENTS

EP 1154434 A1 11/2001
EP 0707316 B1 3/2002

OTHER PUBLICATIONS

U.S. Appl. No. 11/070,622, filed Mar. 2007, Urabe, Masayuki.*
U.S. Appl. No. 60/205,795, filed May 17, 2000.
U.S. Appl. No. 11/070,623, filed Mar. 2005, Urabe Massayuki.

* cited by examiner

*Primary Examiner*—Pho M. Luu

(57) ABSTRACT

A device is fabricated on a flash process semiconductor die. The device includes main memory to store processor information. A cache memory caches a portion of the processor information. A cache controller controls the cache memory. A device interface communicates the processor information to another semiconductor die. Control logic controls the device interface.

10 Claims, 6 Drawing Sheets

FLASH MEMORY MODULE

CROSS-REFERENCE TO RELATED APPLICATIONS

This application is a continuation of U.S. patent application Ser. No. 10/348,091 now Pat. No. 6,972,977), filed Jan. 21, 2003, now U.S. Pat. No. 6,972,977 which incorporates by reference the entire contents of U.S. provisional application No. 60/205,795 filed May 17, 2000, and the entire contents of U.S. Pat. No. 6,859,399, issued Feb. 22, 2005.

TECHNICAL FIELD

This application is related to U.S. patent application Ser. No. 11/070,622, filed on Mar. 2, 2005, and U.S. patent application Ser. No. 11/184,753 (now Pat. No. 7,433,218), filed on Jul. 19, 2005, which are incorporated by reference in their entirety.

BACKGROUND

Many electronic devices include embedded systems having central processor units (CPUs) to control the operation of the device providing greatly enhanced functionality and operational flexibility. Typically, non-volatile memory is included as a portion of the embedded system to store operating system program code and data for operating the embedded system. Recently, embedded systems have begun to use flash memory for the non-volatile memory. Flash memory may advantageously be reprogrammed while also providing non-volatile storage of information.

FIG. 1 shows a one chip type of conventional embedded system 10 that employs flash memory. The embedded system 10 includes an embedded CPU 12 with system logic 14 and static RAM (SRAM) 16 for caching operations. Flash memory 18 provides non-volatile storage for information such as program code and data. A Flash process is used to fabricate the embedded system 10 on a single semiconductor die so that a block of Flash memory may be formed directly on the same semiconductor die. The one chip type of conventional embedded system advantageously does not require interface circuits between the Flash memory 18 and the CPU 12. However, using a Flash process for the entire embedded system 10 increases the cost of the system, decreases the speed performance, and increases the power consumption.

FIG. 2 shows a two chip type of conventional embedded system 20 that uses Flash memory. The embedded system 20 is fabricated using a digital process semiconductor die 22 and a Flash process semiconductor die 24. The digital process semiconductor die 22 may include an embedded CPU 26, system logic 28, SRAM 30, cache 32, and a cache controller 34. The Flash process semiconductor die 24 includes Flash memory 36 for providing non-volatile storage of information. The Flash memory may be connected to the digital process semiconductor die 22 through a standard interface 38 such as a serial interface or a parallel interface. The two chip type of conventional embedded system 20 may cost less and use less power than the one chip type due to using the lower cost digital process for a portion of the system. The speed performance of the two chip system may be increased by using the digital process for the embedded CPU 26, but decreased due to the standard interface 38 that connects the two semiconductor dies 22 and 24.

SUMMARY

A device fabricated on a flash process semiconductor die. The device including main memory to store processor information. A cache memory to cache a portion of the processor information. A cache controller to control the cache memory. A device interface to communicate the processor information to another semiconductor die. Control logic to control the device interface.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
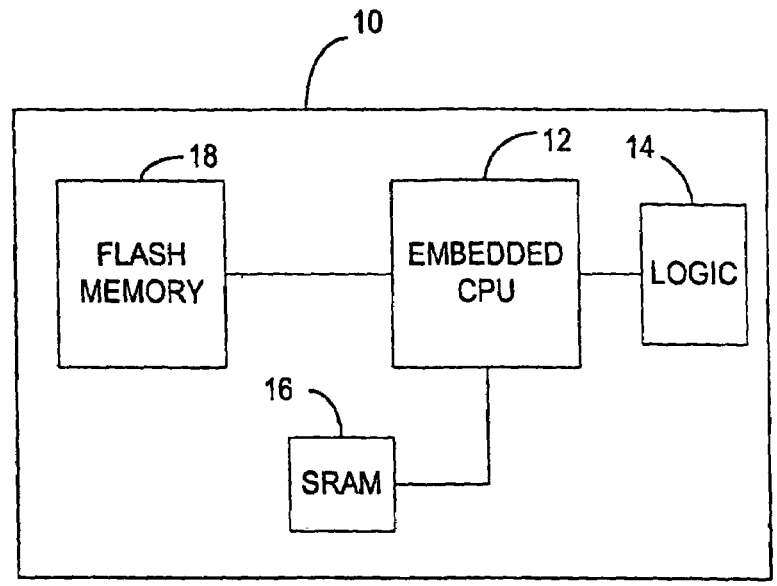
FIG. 1 is a block diagram of a conventional embedded system.
Figure 2:
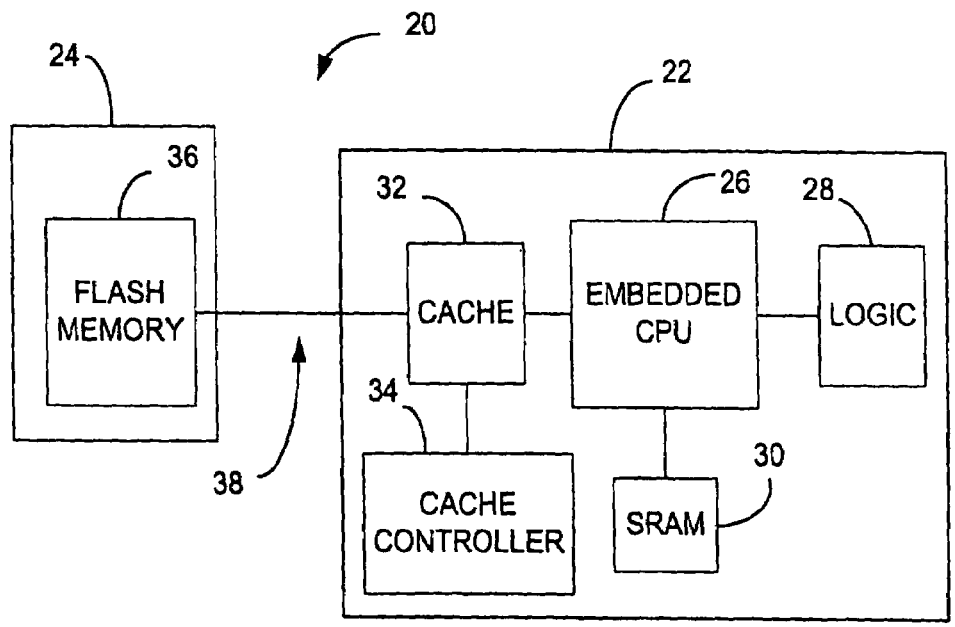
FIG. 2 is a block diagram of another conventional embedded system.
Figure 3:
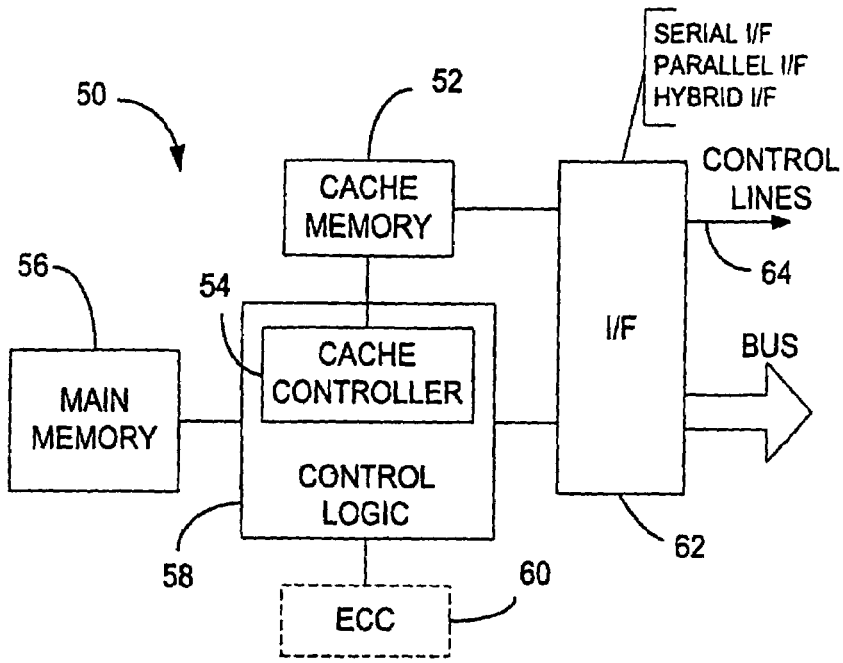
FIG. 3 is a block diagram of an aspect of a flash memory module.

FIG. 3 shows an aspect of a flash memory module 50 for providing non-volatile storage of information. The flash memory module 50 is constructed using a flash process and may be implemented in a single semiconductor die. Each of the components within the flash memory module 50 is formed using a flash process. The flash memory module 50 is most suitable for providing non-volatile storage for an embedded processor system. Cache memory 52 and a cache controller 54 may be included in the flash memory module 50 to provide temporary storage of information such as pages of program code and program data to enhance processing speed. One or more pages of information may be stored in the cache memory 52. In one instance, one page may store a portion of program code, another page may store interrupt information, and a third page may store a portion of program data. Any type of cache configuration may be used such as predictive and prefetch including all forms of set associative caching. The cache may be automatically selectable as well as programmable.

Main memory 56 provides non-volatile storage for the program code and data for operating a processor such as in an embedded system. The main memory 56 may arranged in any form of architecture including a page architecture and a heap architecture. In one example, the main memory 56 may include 3 MBits arranged in 32 KByte pages with a cache memory 52 of 64 Bytes.

Control logic 58 may include the cache controller 54 and control accesses to the main memory 56. The control logic 58 is formed using a flash process.

An error correction module 60 may detect and correct errors in the information flowing between the flash memory module and the embedded processor. Any error correction scheme may be used including cyclic redundancy check (CRC), parity, and forward error correction (FEC).

The flash memory module 50 may include one or more interfaces (I/F) 62 to communicate information between the flash memory module 50 and external components such as an embedded processor. The interface 62 may include a serial interface, a hybrid interface, a parallel interface, and combinations of these interfaces. In one aspect, the flash memory module 50 may include a hybrid interface in combination with a serial interface. An aspect of the hybrid interface is described in U.S. provisional application 60/205,795 filed May 17, 2000, and U.S. non-provisional application Ser. No. 09/620,545 filed Jul. 20, 2000, which are each incorporated by reference in their entirety.

Figure 4:
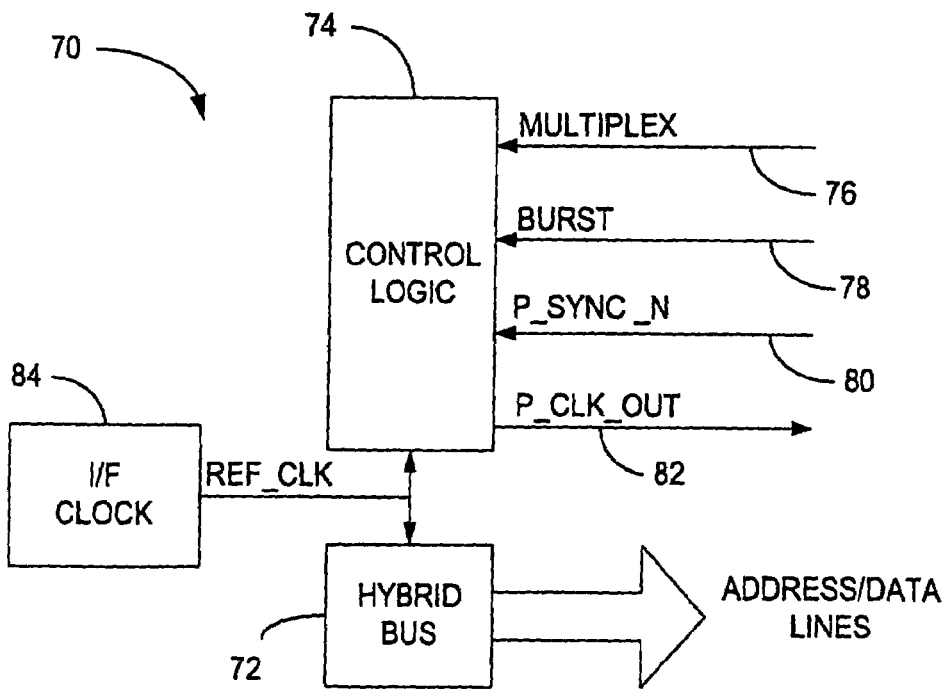
FIG. 4 is a block diagram of an aspect of a hybrid interface.

FIG. 4 shows an aspect of a hybrid I/F 70 in accordance with the principles of the invention. The hybrid I/F 70 includes a hybrid bus 72 for communicating address and data information. The hybrid bus 72 includes one set of lines that are used to communicate both address and data information. Control logic 74 may generate a multiplex signal 76 to indicate whether address or data information is communicated over the hybrid bus 72. Using a single set of lines to transfer address and data information may reduce the quantity of lines used to transfer information by a factor of two or more in comparison to a parallel I/F while retaining most of the speed advantage of a parallel I/F over a serial I/F. In one aspect, the hybrid bus 72 may include 8 lines which may be used to alternately transfer 8 bits of address and 8 bits of data.

A burst signal 78 may control a burst mode in which multiple bytes of data may be transferred sequentially over the hybrid bus 72. The burst signal 78 may comprise one or more digital signals to indicate multiple burst levels. In one aspect, a single line may be used to indicate two burst levels including a low burst level such as 4 Bytes and a high burst level such as 8 Bytes.

A sync signal, P_SYNC_N, 80, may in combination with higher order bits of the hybrid bus 72 control the transmission of READ or instructions over the hybrid bus 72.

A clock reference signal, REF_CLK, and clock output signal, P_CLK_OUT, 82 may be generated from an I/F clock 84. The clock output signal 82 may be used to send READ data on the hybrid bus 72.

Figure 5:
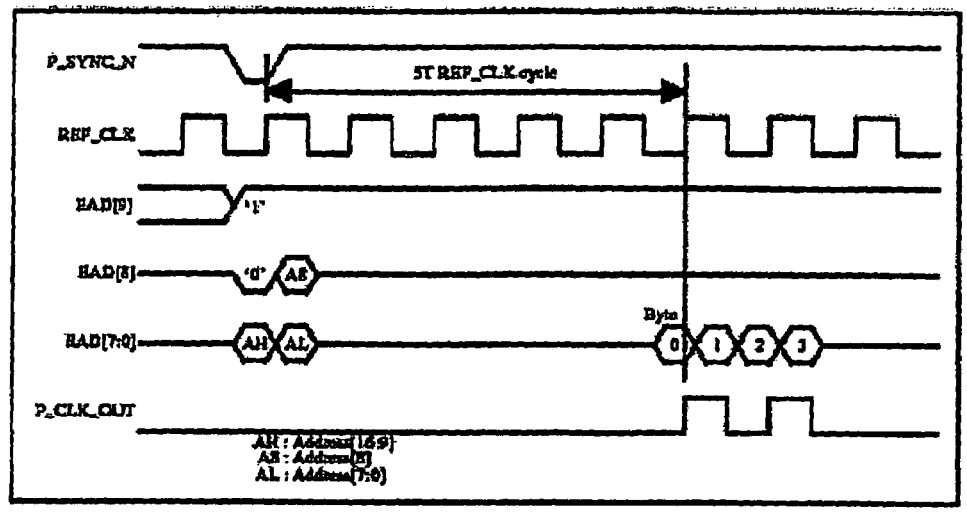
FIGS. 5-8 are graphical illustrations of waveforms associated with an aspect of a hybrid interface.
Figure 6:
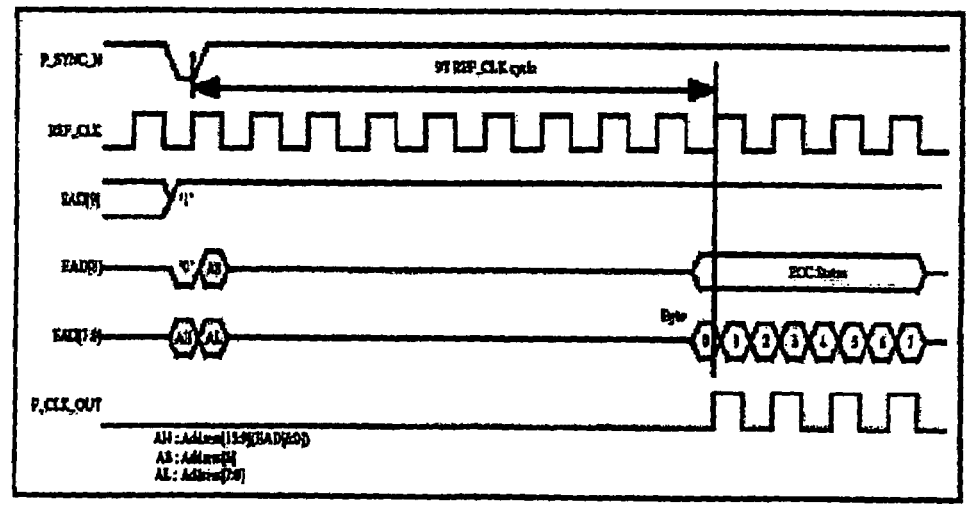
Figure 7:
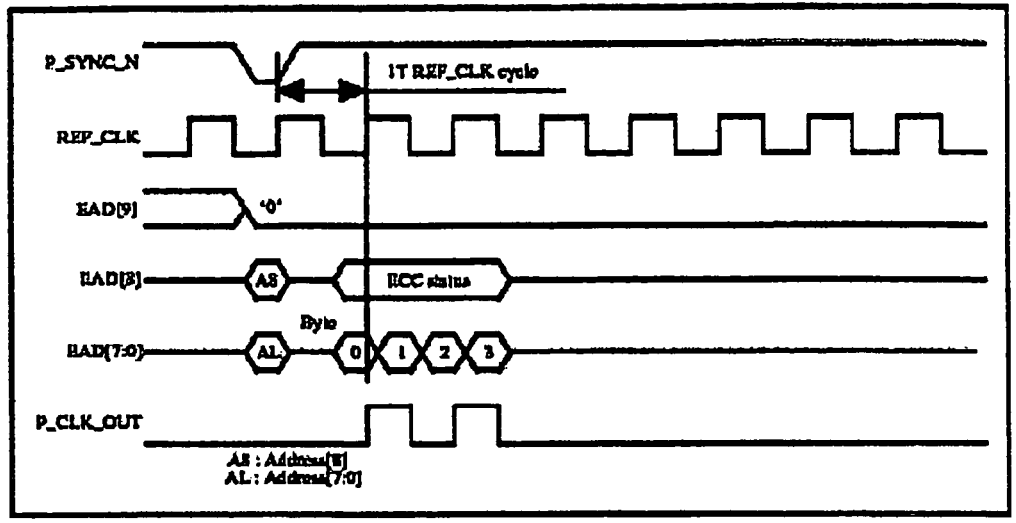
Figure 8:
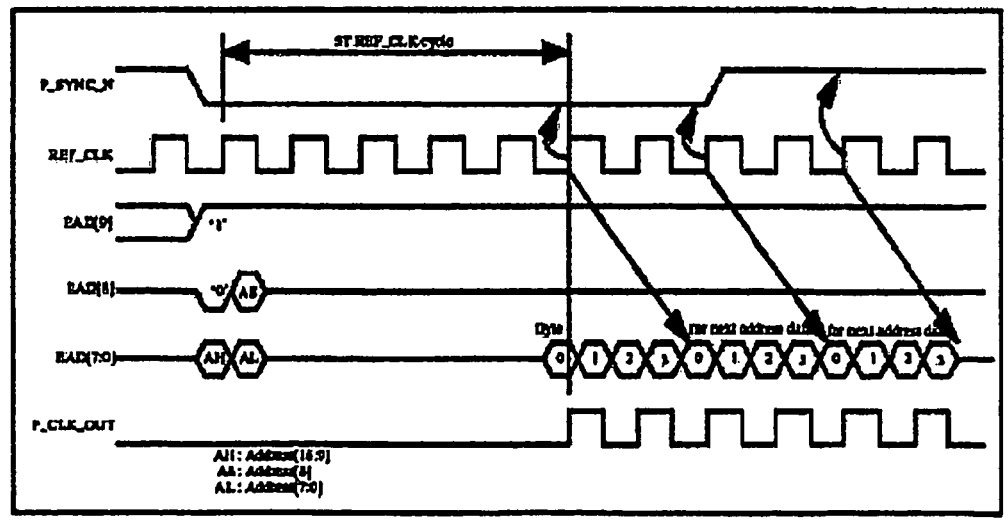

FIGS. 5-8 show waveforms associated with aspects of the hybrid I/F 70. In FIGS. 5-9, the address/data lines of the hybrid bus 72 are represented as EAD(9:0). FIG. 5 shows a READ operation without error correction and with a 4 Byte burst. FIG. 6 shows a READ operation with error correction and with an 8 Byte burst. FIG. 7 shows a cached READ operation with error correction and a 4 Byte burst. FIG. 8 shows a continuous READ operation by the P_SYNC_N signal without error correction and with a 4 Byte burst.

Although FIGS. 5, 6, and 8 each show access time as a fixed duration being illustrated as 5T, 9T, and 5T in FIGS. 5, 6 and 8 respectively, the access time may also be varied such as by selecting or programming the access time as a function of the access time of the Flash memory and the frequency of the REF_CLK. For example, the duration may be selected to be 5T_REF_CLK for a flash memory access time of 30-40 nsec with a REF_CLK frequency of about 100 MHz and be changed to be 3T REF_CLK for a flash memory access time of 30-40 nsec with a REF_CLK frequency of about 60 MHz.

Figure 9:
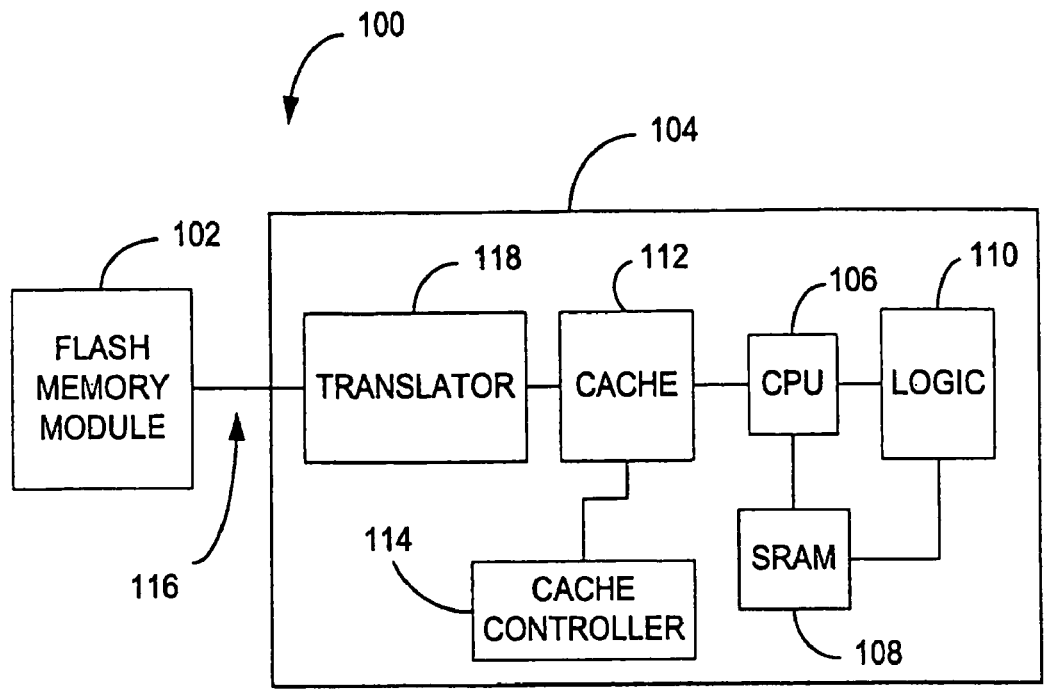
FIG. 9 is a block diagram of an aspect of an embedded processor system in accordance with the principles of the invention.

FIG. 9 shows an embedded processor system 100 for controlling an electronic device. The embedded processor system 100 includes a flash memory module 102 fabricated using a Flash process, and a system on a chip (SOC) 104 fabricated using a digital process. The flash memory module 102 is similar in operation and composition to flash memory module 70. The embedded processor system 100 may advantageously cost less, have faster performance, and consume less than power than conventional embedded processor systems due to the unique arrangement of functions between the flash memory module 102 and the SOC 104.

The SOC 104 may include an embedded CPU 106, SRAM 108, system logic 110, cache memory 112, and a cache controller 114 for processing program code and data. The embedded processor system 100 may include any type of SOC fabricated with a digital process and having an embedded CPU. The program code and data associated with the embedded CPU 106 are stored in the flash memory module 102 and communicated to the SOC 104 through an interface (I/F) 116. The flash memory module 102 provides non-volatile storage for the program code and data. A translator 118 may translate the information flowing between the interface 116 and the internal bus structure of the SOC 104. Generally, control signals flow from the SOC 104 to the flash memory module 102; while during READ operations, instructions and data flow from the flash memory module 102 to the SOC 104. However, instructions and data may also flow towards the flash memory module 102 such as when the main memory in the flash memory module is being rewritten.

Figures 10A, 10B:
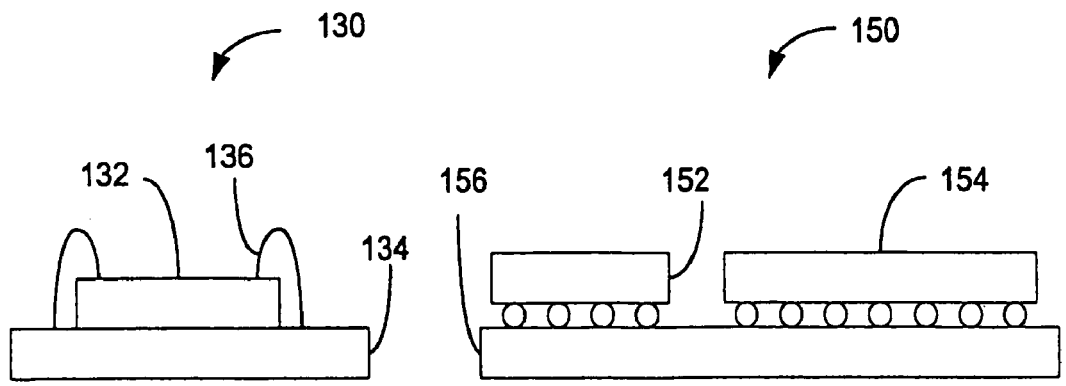
FIGS. 10A and 10B are two-dimensional views of aspects of packaging configurations for an aspect of an embedded system.

FIGS. 10A and 10B show two exemplary types of assembled embedded processor systems in accordance with the teachings of this specification. The scope of the invention is not limited in any manner by the means with which a flash memory module is mechanically connected to a SOC.

FIG. 10A shows a stackable embedded processor system 130. A flash memory module 132 is stacked on a SOC 134 and electrically connected with bond wires 136.

FIG. 10B shows a multi-chip module embedded processor system 150. A flash memory module 152 may be electrically connected to a SOC 154 through a substrate 156 on which the flash memory module 152 and the SOC 154 are flip chip mounted.

Figure 11:
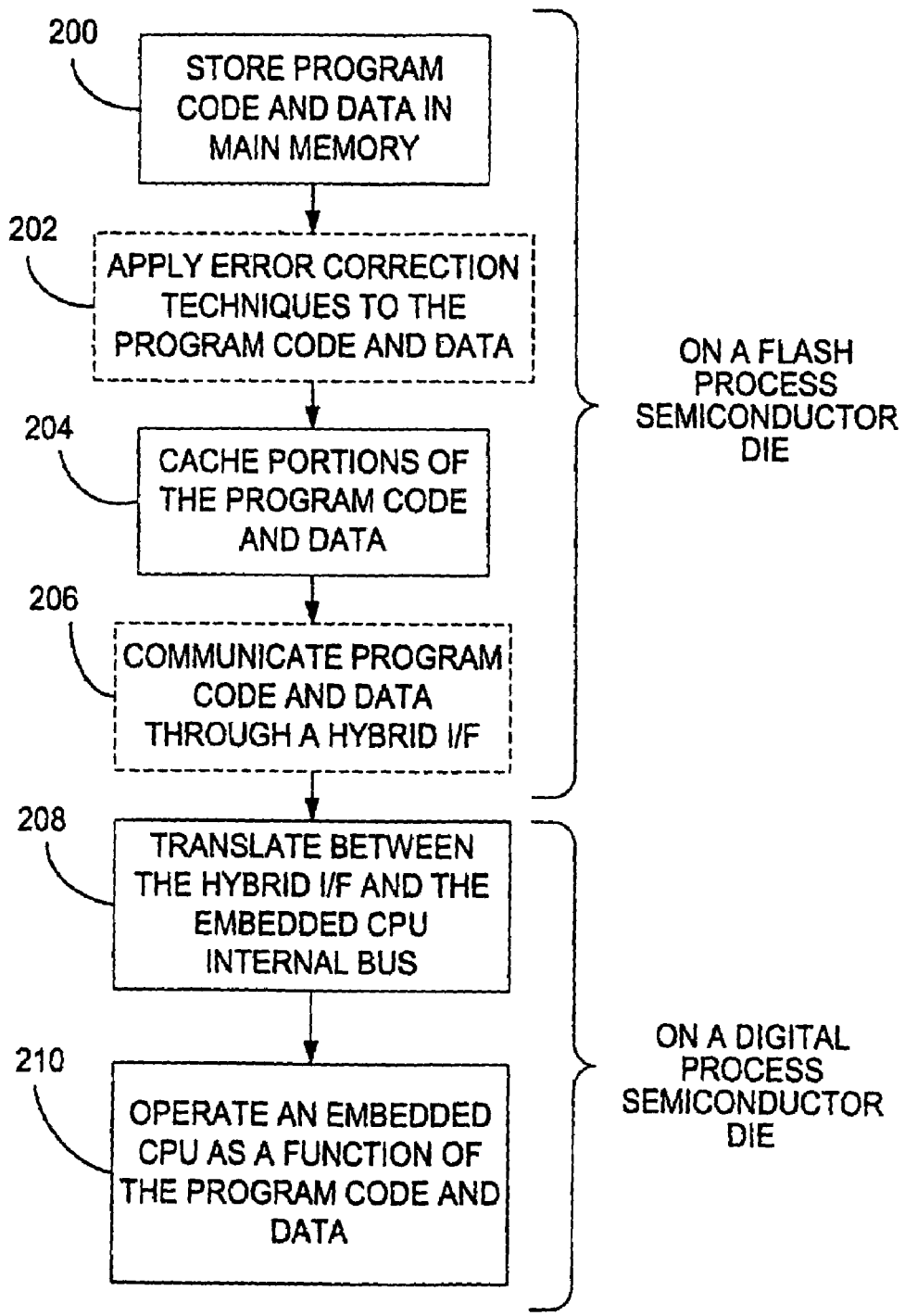
FIG. 11 is a flow diagram of an aspect of a flash memory module.

FIG. 11 shows a flow diagram of an operation for processing information in an embedded system. Starting at block 200, program code and data associated with an embedded CPU are stored in main memory on a flash process semiconductor die. Continuing to block 202, error correction techniques may be applied to program code and data that is communicated. At block 204, portions of the program code and data may be cached on the flash process semiconductor die. Continuing to block 206, program code and data may be communicated through a hybrid interface with the embedded CPU. At block 208, on a digital process semiconductor die, translate the communicated program code and data between the hybrid I/F and the internal bus of the embedded CPU. Continuing to block 210, operate an embedded CPU as a function of the program code and data.

A number of embodiments of the invention have been described. Nevertheless, it will be understood that various modifications may be made without departing from the spirit and scope of the invention. Accordingly, other embodiments are within the scope of the following claims.

What is claimed is:
1. A device comprising:
 a flash process semiconductor die including:
  main memory to store circuit information associated with another semiconductor die;

cache memory in communication with the main memory to cache a portion of the circuit information;
a cache controller to control the cache memory;
a device interface to communicate the circuit information to the other semiconductor die; and
control logic to control the device interface.

2. The device of claim 1 wherein the device interface includes a hybrid interface.

3. The device of claim 1 wherein the device interface includes a serial interface.

4. A device comprising:
a flash process semiconductor die including:
main memory to store circuit information associated with another semiconductor die;
a hybrid interface to communicate the circuit information to the other semiconductor die; and
control logic to control the hybrid interface.

5. The device of claim 4 further comprising a serial interface.

6. A device comprising:
a flash process semiconductor die including:
means for storing circuit information associated with another semiconductor die;
means for caching a portion of the circuit information, the caching means in communication with the main memory;
means for controlling the cache memory;
means for interfacing to communicate the circuit information to the other semiconductor die; and
means for controlling the device interface.

7. The device of claim 6 wherein the interfacing means includes a hybrid interface.

8. The device of claim 6 wherein the interfacing means includes a serial interface.

9. A device comprising:
a flash process semiconductor die including:
means for storing circuit information associated with another semiconductor die;
a hybrid interface to communicate the circuit information to the other semiconductor die; and
means for controlling to control the hybrid interface.

10. The device of claim 9 further comprising a serial interface.

* * * * *

UNITED STATES PATENT AND TRADEMARK OFFICE
CERTIFICATE OF CORRECTION

PATENT NO. : 7,460,382 B1 Page 1 of 1
APPLICATION NO. : 11/070623
DATED : December 2, 2008
INVENTOR(S) : Masayuki Urabe It is certified that error appears in the above-identified patent and that said Letters Patent is hereby corrected as shown below:

| | |
|---|---|
| Column 1, Line 16-20 | First paragraph under "Technical Field" should go under "Cross-Reference to Related Applications" |
| Column 1, Line 16 | Insert under "Technical Field" -- An aspect of this invention relates to non-volatile semiconductor memory devices. -- |
| Column 2, Line 63 | Insert -- be -- after "may" |
| Column 4, Line 8 | Delete "than" after "less" |

Signed and Sealed this

Twenty-fourth Day of February, 2009

JOHN DOLL
*Acting Director of the United States Patent and Trademark Office*